(12) United States Patent
Cho et al.

(10) Patent No.: US 7,417,964 B2
(45) Date of Patent: Aug. 26, 2008

(54) TRANSMISSION APPARATUS AND METHOD FOR USE IN MOBILE COMMUNICATION SYSTEM BASED ON ORTHOGONAL FREQUENCY DIVISION MULTIPLEXING SCHEME

(75) Inventors: Young-Kwon Cho, Suwon-si (KR); Katz Marcos Daniel, Suwon-si (KR); Seok-Hyun Yoon, Seoul (KR); Dong-Seek Park, Yongin-si (KR); Seong-Ill Park, Seongnam-si (KR); Ho-Kyu Choi, Seongnam-si (KR); Pan-Yuh Joo, Yongin-si (KR); Young-Kyun Kim, Seongnam-si (KR); Hyeon-Woo Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 715 days.

(21) Appl. No.: 10/872,807

(22) Filed: Jun. 21, 2004

(65) Prior Publication Data
US 2004/0258134 A1 Dec. 23, 2004

(30) Foreign Application Priority Data
Jun. 20, 2003 (KR) ...................... 10-2003-0040352

(51) Int. Cl.
*H04B 7/204* (2006.01)
(52) U.S. Cl. ..................... 370/319; 370/210; 370/337; 370/344; 370/347; 370/330
(58) Field of Classification Search ................. 370/208, 370/210, 330, 319, 337, 344; 455/442; 307/347
See application file for complete search history.

(56) References Cited
U.S. PATENT DOCUMENTS
6,246,713 B1 * 6/2001 Mattisson .................... 375/132
(Continued)

FOREIGN PATENT DOCUMENTS
EP 1 039 683 3/2002
(Continued)

OTHER PUBLICATIONS
Chen et al., "Multicarrier CDMA with Adaptive Frequency Hopping for Mobile Radio Systems", IEEE Journal of Selected Areas in Communications, vol. 14, No. 9, Dec. 1996, pp. 1852-1858.
(Continued)

*Primary Examiner*—Duc Nguyen
*Assistant Examiner*—Wayne Cai
(74) *Attorney, Agent, or Firm*—The Farrell Law Firm, PC

(57) ABSTRACT

A transmitter for a mobile communication system based on an OFDM scheme and a method for controlling the same. The transmitter can implement a characteristic of a multiple access scheme based on an OFDM scheme, a characteristic of a CDMA scheme, and a characteristic of a frequency hopping scheme which has very strong resistance to the frequency selective fading. An apparatus for transmitting information bit sequences from a BS (Base Station) transmitter to different users, includes a plurality of channelizers for dividing a single frame of information bit sequences to be transmitted to individual users into a plurality of times according to a given time interval, simultaneously transmitting the information bit sequences to the individual users within the plurality of division times, dividing the information bit sequences, spreading the divided information bit sequences using different Walsh codes, converting the spread information bit sequences into a single sequence associated with the individual users, and outputting the single sequence; and a frequency hopper for dividing the single sequence, distributing the spread information bit sequences over a plurality of bandwidths capable of mapping-processing the spread information bit sequences with sub-carrier frequencies, and preventing each of the bandwidths from overlapping with time-frequency cells given by the given time interval.

25 Claims, 7 Drawing Sheets

U.S. PATENT DOCUMENTS

| | | | |
|---|---|---|---|
| 2002/0159422 A1 | 10/2002 | Li et al. | |
| 2003/0152023 A1* | 8/2003 | Hosur et al. | 370/208 |
| 2004/0219920 A1* | 11/2004 | Love et al. | 455/442 |

FOREIGN PATENT DOCUMENTS

| | | |
|---|---|---|
| JP | 09-270735 | 10/1997 |
| JP | 11-017644 | 1/1999 |
| JP | 2001-144724 | 5/2001 |
| JP | 2001-238269 | 8/2001 |
| JP | 2002-111631 | 4/2002 |
| JP | 2003-032220 | 1/2003 |
| KR | 10-2001-0016948 | 3/2001 |
| WO | WO 03/021829 | 3/2003 |

OTHER PUBLICATIONS

DaSilva et al., "Multicarrier Orthogonal CDMA Signals for Quasi-Synchronous Communication Systems", IEEE Journal on Selected Areas in Communication, Vo. 12, No. 5, Jun. 1994, pp. 842-852.

Zhou et al., "Generalized Frequency Hopping OFDMA Through Unknown Frequency-Selective Multipath Channels", 2000 IEEE, pp. 56-60.

* cited by examiner

TRANSMISSION APPARATUS AND METHOD FOR USE IN MOBILE COMMUNICATION SYSTEM BASED ON ORTHOGONAL FREQUENCY DIVISION MULTIPLEXING SCHEME

PRIORITY

This application claims priority to an application entitled "TRANSMISSION APPARATUS AND METHOD FOR USE IN MOBILE COMMUNICATION SYSTEM BASED ON ORTHOGONAL FREQUENCY DIVISION MULTIPLEXING SCHEME", filed in the Korean Intellectual Property Office on Jun. 20, 2003 and assigned Ser. No. 2003-40352, the contents of which are incorporated herein by reference.

BACKGROUND OF THE INVENTION

1. Field of the Invention

The present invention relates to a transmission apparatus and method for use in a mobile communication system based on an OFDM (Orthogonal Frequency Division Multiplexing) scheme, and more particularly to a transmission apparatus and method for supporting a multiple access scheme on the basis of the OFDM scheme.

2. Description of the Related Art

Recently, mobile communication systems have developed from mobile systems for providing a user with voice signals to a wireless packet communication system for providing the user with high-speed and high-quality wireless data packets, such that anyone can use a variety of data services and multimedia services. The third-generation mobile communication system is classified into an asynchronous 3GPP (3rd Generation Partnership Project), and a synchronous 3GPP2, each of which are being standardized for implementing high-speed and high-quality wireless packet communication services. For example, an HSDPA (High Speed Downlink Packet Access) standardization is in progress in the 3GPP, and a 1xEV-DV (1xEvolution Data and Voice) standardization is in progress in the 3GPP2. The 1xEV-DV standardization for the downlink is "IS-2000 Release C". Presently, the standardization of the uplink is in progress, and the uplink is being standardized under the title "IS-2000 Release D". The aforementioned standardizations are needed for users or subscribers to receive high-speed (more than 2Mbps) and high-quality wireless data packet transmission service in the third-generation mobile communication systems. A fourth-generation mobile communication system is needed for users or subscribers to receive higher-speed and higher-quality multimedia communication services.

Technical solutions for providing high-speed and high-quality wireless data packet services require improved software capable of developing more diverse and abundant contents and improved hardware capable of developing wireless access technology, which can provide users with excellent services and has high spectrum efficiency.

The aforementioned improved hardware, from among the technical solutions, will firstly be described.

The high-speed and high-quality data service available in wireless communication is generally deteriorated by channel environments. Channel environments for wireless communication are frequently changed by a variety of factors, for example, white noise, variation in reception signal power, shadowing, movement of a Subscriber Station (SS), a Doppler effect caused by a frequent change in speed, and interference caused by other users or a multi-path signal. Therefore, in order to provide the aforementioned high-speed wireless data packet service, technology improvements over the second-generation or third-generation mobile communication systems, and which improves adaptive capacity for channel variation, is required. Although a high-speed power control scheme for use in the conventional system enhances adaptive capacity for such channel variation, the 3GPP and the 3GPP2 which are currently processing a high-speed data packet transmission system standard commonly utilize an Adaptive Modulation and Coding (AMC) scheme and a Hybrid Automatic Repeat Request (HARQ) scheme.

The AMC scheme changes a modulation scheme and a code rate of a channel encoder according to a variation in the downlink channel. In this case, downlink channel quality information can generally be obtained by measuring a Signal-to-Noise Ratio (SNR) of a signal using the SS functioning as a terminal receiver. The SS transmits the channel quality information to a BS (Base Station) through an uplink. The BS predicts the downlink channel conditions on the basis of the downlink channel quality information, and prescribes an appropriate modulation scheme and a code rate for a channel encoder on the basis of the predicted downlink channel condition. Therefore, an Adaptive Modulation and Coding (AMC) system adapts a high-order modulation scheme and a high code rate to an SS (Subscriber Station) having an excellent channel. However, the AMC system adapts a low-order modulation scheme and a low code rate to an SS having a relatively inferior channel. Typically, the SS having the excellent channel may be positioned in the vicinity of the BS, and an SS having the relatively inferior channel may be positioned at a cell boundary. The aforementioned AMC scheme can largely reduce an interference signal as compared to a conventional scheme dependent on a high-speed power control, resulting in the improvement of system performance.

If an unexpected error occurs in an initial transmission data packet, the HARQ scheme requires retransmission of the data packet to compensate for the erroneous packet. In this case, a predetermined link control scheme is adapted to the compensation process of the erroneous packet, and is considered to be equal to the HARQ scheme. The HARQ scheme is called a Chase Combining (CC) scheme, and is classified into a Full Incremental Redundancy (FIR) scheme and a Partial Incremental Redundancy (PIR) scheme. The CC scheme transmits all of the packets during a retransmission operation in the same manner as in an initial transmission process. In this case, a reception end combines the retransmission packet with the initial transmission packet to increase reliability of a coded bit received in a decoder, such that the reception end can obtain an overall system performance gain. In this case, if two equal packets are combined with each other, an effect similar to that of an iterative coding occurs, and a performance gain of about 3 dB can be attained on average.

The FIR scheme retransmits a packet composed of only redundant bits generated from a channel encoder, instead of retransmitting the same packet, such that the FIR scheme can improve a coding gain of a decoder included in the reception end. That is, the decoder uses both initial transmission information and new redundant bits during a decoding process, resulting in an increased coding rate. As a result, the decoder's performance can also be improved. It is well known in coding theory that a performance gain obtained by a low coding rate is greater than a performance gain obtained by an iterative coding rate. Therefore, when considering only the performance gain, the FIR scheme provides better performance than that of the CC scheme.

The PIR scheme transmits a data packet which is composed of a combination of information bits and new information bits during a retransmission time. The PIR scheme combines the information bits with the initial transmission information bits during a decoding process, such that it can obtain an effect similar to that of the CC scheme. Also, the PIR scheme performs the decoding process using the redundant bits, such that it can obtain effects similar to those of the FIR scheme. The PIR scheme has a coding rate greater than that of the FIR scheme, such that it's the PIR scheme performance is considered to be intermediate between individual performances of the FIR and CC schemes. However, the HARQ scheme must consider a variety of factors related to performance and system complexity (e.g., a buffer size and a signaling, etc.), such that it is difficult to determine either one of the factors.

Provided that the AMC scheme and the HARQ scheme use independent techniques capable of improving the adaptive capacity for a channel variation or are combined with each other, system performance can be greatly improved. In other words, if a modulation scheme suitable for the downlink channel conditions and a coding rate of the channel encoder are determined by the AMC scheme, a data packet corresponding to the determined information is transmitted.

However, although the aforementioned two schemes are used, the principal problem encountered in radio communication, i.e., the lack of radio resources, is incapable of being solved. In more detail, multiple access—based technology having a superior spectrum efficiency must be developed to maximize subscriber capacity and to enable high-speed data transmission requisite for a multimedia service. In conclusion, a new multiple access scheme having superior spectrum efficiency must be developed to provide the high-speed and high-quality packet data service.

SUMMARY OF THE INVENTION

Therefore, the present invention has been made in view of the above and other problems, and it is an object of the present invention to provide an apparatus and method for providing wide-band spectrum resources needed for a high-speed wireless multimedia service indicative of the objective of the next-generation mobile communication system.

It is another object of the present invention to provide a multiple access scheme and associated transmitter for effectively using time-frequency resources.

It is yet another object of the present invention to provide an effective multiple access scheme and a time-frequency resource utilization method which can effectively provide a high-speed wireless multimedia service indicative of the objective of the next-generation mobile communication system.

It is yet further another object of the present invention to provide a multiple access scheme which includes both characteristics of a CDMA scheme and characteristics of a frequency hopping scheme on the basis of an OFDM (Orthogonal Frequency Division Multiplexing) scheme, and a transmitter for use in the multiple access scheme.

It is yet further another object of the present invention to provide a forward channel configuration in a multiple access scheme which includes both characteristics of a CDMA scheme and characteristics of a frequency hopping scheme on the basis of an OFDM scheme.

It is yet further another object of the present invention to provide a multiple access scheme which combines portions of an OFDM scheme, a CDMA scheme, and a frequency hopping scheme, and a transmitter for use in the multiple access scheme.

It is yet further another object of the present invention to provide a multiple access scheme for differentially assigning time-frequency resources to individual users, and a transmitter for use in the multiple access scheme.

It is yet further another object of the present invention to provide a multiple access scheme for differentially assigning time-frequency resources to individual services corresponding to individual users, and a transmitter for use in the multiple access scheme.

In accordance with one aspect of the present invention, the above and other objects can be accomplished by the provision of an apparatus for transmitting information bit sequences from a BS (Base Station) transmitter to a plurality of users, comprising a plurality of channelizers for dividing a single frame time of information bit sequences to be transmitted to individual users into a plurality of times according to a given time interval, dividing the information bit sequences within the plurality of division times, spreading the divided information bit sequences using different Walsh codes, combining the spread information bit sequences into a single sequence associated with the individual users, and outputting the single sequence; and a frequency hopper for dividing the single sequence, distributing the spread information bit sequences over a plurality of bandwidths capable of mapping-processing the spread information bit sequences with sub-carrier frequencies, and preventing each of the bandwidths from overlapping with time-frequency cells given by the given time interval.

In accordance with another aspect of the present invention, there is provided a method for transmitting information bit sequences from a BS (Base Station) transmitter to a plurality of users, comprising the steps of a) dividing a single frame time of information bit sequences to be transmitted to individual users into a plurality of times according to a given time interval, dividing the information bit sequences within the plurality of division times, spreading the divided information bit sequences using different Walsh codes, combining the spread information bit sequences into a single sequence associated with individual users, and outputting the single sequence; and b) dividing the information bit sequences, which have been combined into the single sequence in step (a), distributing the spread information bit sequences over a plurality of bandwidths capable of mapping-processing the spread information bit sequences with sub-carrier frequencies, and performing a frequency hopping function such that each of the bandwidths does not overlap with the time-frequency cells given by the given time interval.

In accordance with yet another aspect of the present invention, there is provided a transmission apparatus for use in a mobile communication system capable of transmitting information bit sequences from a BS (Base Station) transmitter to a plurality users, comprising a plurality of traffic channel transmitters for dividing a modulation data symbol sequence corresponding to a predetermined user into division modulation data symbol sequences, the number of which is equal to the number of sub-channels assigned to the predetermined user, spreading the respective division modulation data symbol sequences using different channelization codes, and performing a mapping-process with sub-carriers comprising a corresponding sub-channel; a TDM (Time Division Multiplexer) for receiving a first input signal from the traffic channel transmitters, the first input signal including traffic channel signals from the traffic channel transmitters, a pilot channel signal, and sync (synchronous) and shared channel signals, which have been spread by a predetermined channelization code and have been modulated by a predetermined modulation scheme, and receiving a preamble channel signal as a second input signal, such that the first input signal and the second input signal are selected in time-domain units of the sub-channel; and an IFT (Inverse Fourier Transform) unit for IFT-processing a signal selected by the TDM, and generating the IFT-processed result.

In accordance with yet further another aspect of the present invention, there is provided a transmission method for use in a mobile communication system capable of transmitting information bit sequences from a BS (Base Station) transmitter to a plurality of users, comprising the steps of a) dividing a modulation data symbol sequence corresponding to a predetermined user into division modulation data symbol sequences, the number of which is equal to the number of sub-channels assigned to the predetermined user, spreading the respective division modulation data symbol sequences using different channelization codes, and performing a mapping-process in association with sub-carriers comprising a corresponding sub-channel; b) multiplexing a first input signal and a second input signal such that the first input signal and the second input signal are selected in time-domain units of the sub-channel; wherein the first input signal includes traffic channel signals, a pilot channel signal, and sync (synchronous) and shared channel signals, which have been spread by a predetermined channelization code and have been modulated by a predetermined modulation scheme, and a preamble channel signal is the second input signal, and c) IFT (Inverse Fourier Transform)—processing a signal selected at step (b), and generating the IFT-processed result.

In accordance with yet further another aspect of the present invention, there is provided a transmission method for use in a mobile communication system based on a multiple access scheme, comprising the steps of a) assigning at least one sub-channel to a predetermined user, spreading data of the predetermined user using prescribed encoded codes associated with individual sub-carriers comprising the sub-channel; b) in association with individual output data of the sub-channels, assigning different sub-carriers for every time interval, a unit of which is determined to be each of the sub-channels in a time domain; and c) IFT (Inverse Fourier Transform)—processing the data in the assigned sub-carrier areas such that it is converted into time-domain data.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
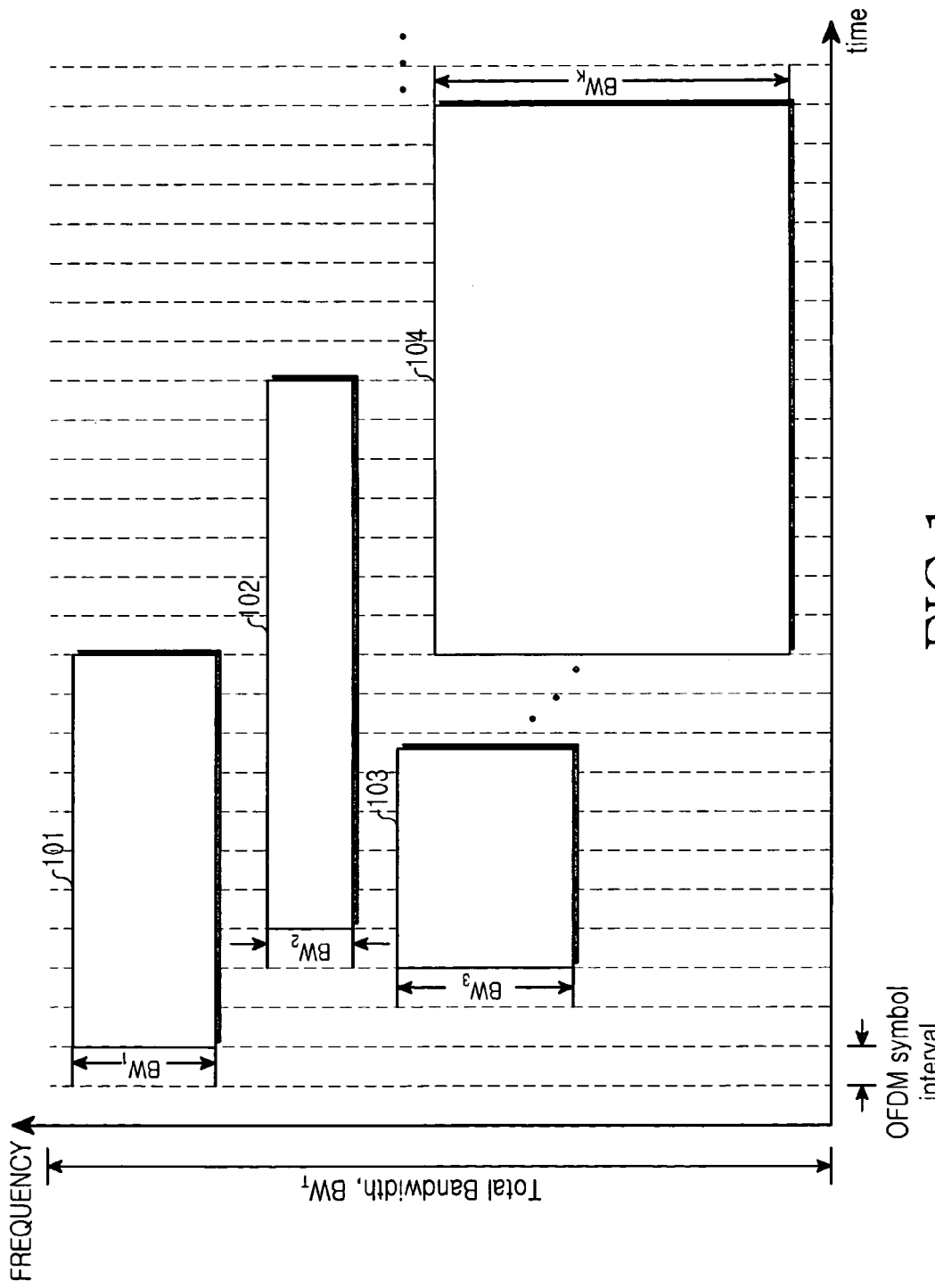
FIG. 1 is a diagram illustrating an exemplary utilization of a time-frequency resource in accordance with the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

The present invention provides a multiple access method accompanied by an effective use of time-frequency resources so as to implement a high-speed wireless multimedia service indicative of the objectives of the next-generation mobile communication system, and a transmitter for use in the multiple access method.

A wide-band spectrum resource is needed for a high-speed wireless multimedia service indicative of the objectives of the next-generation mobile communication system. However, when using the wide-band spectrum resources, a wireless transmission path makes the fading phenomenon prominent due to a multipath propagation, and a frequency-selective fading phenomenon can also be easily observed even in a transmission band. Therefore, in order to implement the high-speed wireless multimedia service, an OFDM scheme having very strong resistance to the frequency-selective fading phenomenon is better than the conventional CDMA scheme, such that many developers are recently conducting intensive research into the OFDM scheme.

Typically, the OFDM scheme enables sub-channel spectrums to maintain mutual orthogonality therebetween, and also enables the sub-channel spectrums to be overlapped with each other, resulting in excellent spectrum efficiency. Also, the OFDM scheme implements a modulation process using an IFFT (Inverse Fast Fourier Transform), and implements a demodulation process using an FFT (Fast Fourier Transform). For example, the multiple access scheme based on the OFDM scheme may be determined to be an OFDM scheme for assigning some part of an overall sub-carrier to a specific user. The OFDM scheme does not require a spreading sequence for bandwidth spreading. The OFDM scheme can dynamically change the set of sub-carriers assigned to a specific user according to fading characteristics of a wireless transmission path, and this operation of the OFDM scheme is typically referred to as "dynamic resource allocation" or "frequency hopping".

The multiple access scheme requiring the spreading sequence is classified into a spreading scheme in a time domain and a spreading scheme in a frequency domain. The spreading scheme in the time domain performs spreading of a user signal in the time domain, and controls the spreading signal to be mapping-processed with a sub-carrier. The spreading scheme in the frequency domain performs demultiplexing of a user signal in the frequency domain, controls the demultiplexing signal to be mapping-processed with a sub-carrier, and distinguishes user signals using orthogonal sequences.

The following multiple access scheme according to the present invention can implement a characteristic of the multiple access scheme based on an OFDM scheme, a characteristic of the CDMA scheme, and a characteristic of the frequency hopping scheme which has very strong resistance to the frequency selective fading. It should be noted that the aforementioned new multiple access scheme is called a Frequency Hopping-Orthogonal Frequency Code Division Multiple Access (FH-OFCDMA) scheme.

FIG. 1 is a diagram illustrating an exemplary utilization of time-frequency resources in accordance with the present invention. In FIG. 1, the abscissa is the time domain, and the ordinate is the frequency domain.

As to the multiplex access scheme capable of supporting K users by properly utilizing time-frequency resources, reference numeral 101 is a time-frequency resource assigned to a first user, reference numeral 102 is a time-frequency resource assigned to a second user, reference numeral 103 is a time-frequency resource assigned to a third user, and reference numeral 104 is a time-frequency resource assigned to a K-th user. The time-frequency resource assigned to every user is determined by a predetermined bandwidth and a predetermined time. The bandwidth may be assigned according to category information of services required by each user. For example, a wide bandwidth is assigned to a user who has requested a service (e.g., a high-speed packet data service, etc.) requiring a large amount of time-frequency resources. However, a narrow bandwidth is assigned to a user who has requested a service (e.g., a voice service, etc.) requiring a small amount of time-frequency resources. The aforementioned bandwidth assignment means that time-frequency resources can be differentially assigned to individual users. In FIG. 1, in comparison with the second user, the remaining users are each assigned a relatively wide bandwidth. Particularly, the widest bandwidth is assigned to the K-th user from among all of the users. In the case of comparing the time-frequency resources 101 assigned to the first user with the time-frequency resources 103 assigned to the third user, a relatively large amount of time resources are assigned to the first user rather than the third user. If the widest bandwidth is assigned to the K-th user, this means that the K-th user currently uses a service requiring much more time-frequency resources as compared to the remaining users.

The bandwidths $BW_1$, $BW_2$, $BW_3$, and $BW_k$ can be represented by the following Equations 1 to 4.

$BW_1$ $$n_1 = M_1 \times m \quad (1)$$

where $M_1$ is the number of sub-channels assigned to the first user, m is the number of sub-carriers comprised of a single sub-channel, and $n_1$ is a total number of sub-carriers assigned to the first user.

$BW_2$ $$n_2 = M_2 \times m \quad (2)$$

where $M_2$ is the number of sub-channels assigned to the second user, and m is the number of sub-carriers comprised of a single sub-channel, and $n_2$ is a total number of sub-carriers assigned to the second user.

$BW_3$ $$n_3 = M_3 \times m \quad (3)$$

where $M_3$ is the number of sub-channels assigned to the third user, and m is the number of sub-carriers comprised of a single sub-channel, and $n_3$ is a total number of sub-carriers assigned to the third user.

$BW_k$ $$n_k = M_k \times m \quad (4)$$

where $M_k$ is the number of sub-channels assigned to the k-th user, and m is the number of sub-carriers comprised of a single sub-channel, and $n_k$ is a total number of sub-carriers assigned to the k-th user.

As can be seen from the aforementioned Equations 1 to 4, the bandwidth is determined by multiplying the number ($n_k$) of overall sub-carriers assigned to the k-th user by the bandwidth $\Delta f_{sc}$ of respective sub-carriers. The number $n_k$ of all sub-carriers assigned to the k-th user is determined by multiplying the number ($M_k$) of sub-channels assigned to the k-th user by the spreading factor, which is equal to the product of the sub-carriers which comprise the k-th sub-channel.

Therefore, if the number of sub-channels assigned to a user is adjusted, a bandwidth usable by the user can also be adjusted. In this case, the above operation in which the bandwidth is assigned considering both service requirements and available time-frequency resources of a corresponding user is called a scheduling algorithm. Although the present invention does not disclose an embodiment of the scheduling algorithm, it is not limited to any a specific embodiment of the scheduling algorithm, and as such may employ any kind of scheduling algorithms.

The bandwidth assignment for every user must be performed within a total bandwidth $BW_T$ predetermined in a frequency domain. The number (M) of all sub-carriers available in the total bandwidth $BW_T$ and the number ($n_k$) of sub-carriers assigned to respective users can both be represented by the following Equation 5:

$$\sum_{k=1}^{K} n_k \leq M \quad (5)$$

Figure 2:
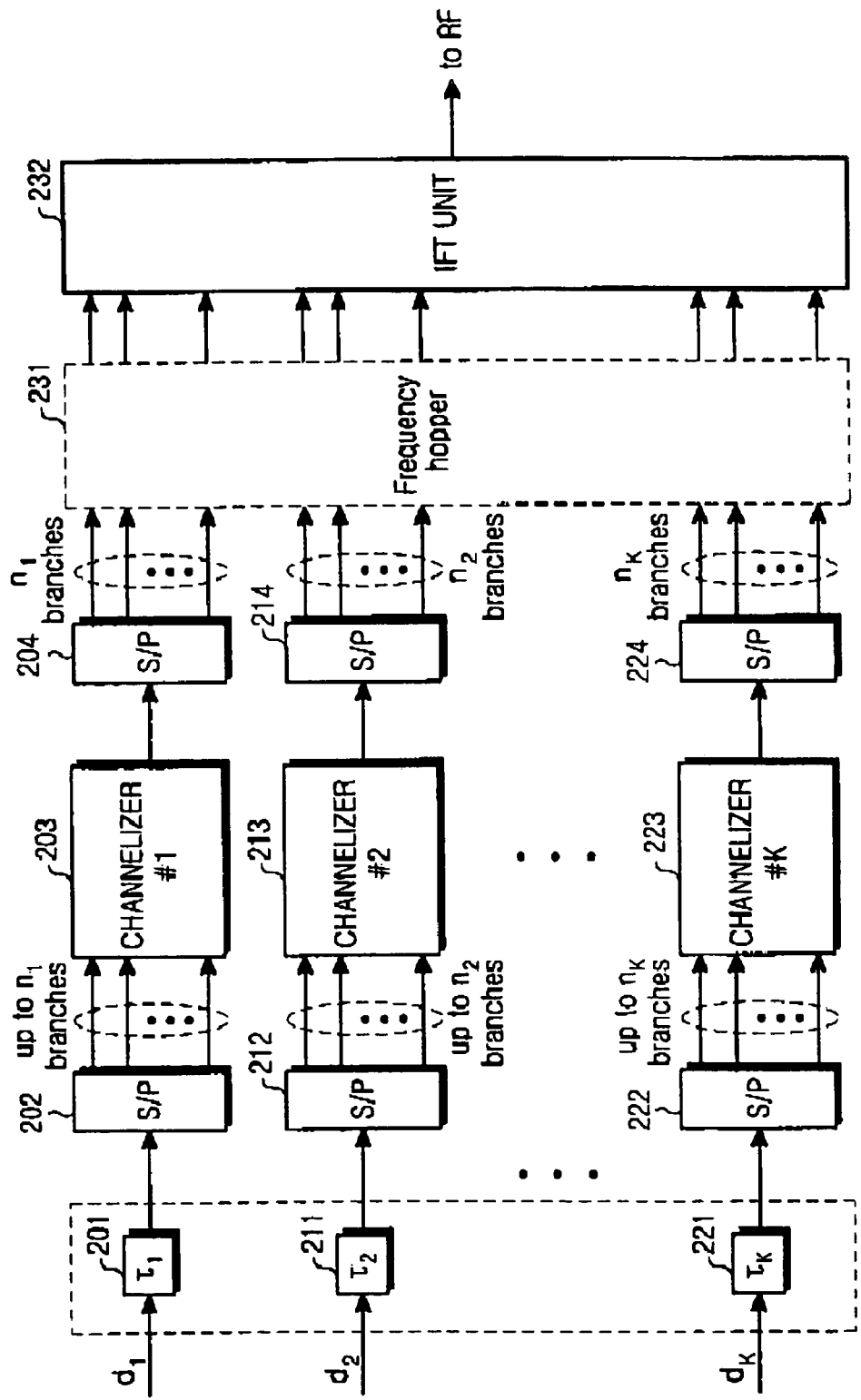
FIG. 2 is a block diagram of a transmitter for use in a mobile communication system of a multiple access scheme in accordance with the present invention.

FIG. 2 is a block diagram of a transmitter for use in a mobile communication system of a multiple access scheme in accordance with the present invention. A detailed configuration of a transmitter for supporting the aforementioned time-frequency resource utilization shown in FIG. 1 is shown in FIG. 2. It is assumed that the transmission of signals ($d_1$, $d_2$, ..., $d_k$) associated with the K users is shown in FIG. 2 in the same manner as in FIG. 1. Also, it is assumed that the signals ($d_1$, $d_2$, ..., $d_k$) associated with the K users have already been channel-encoded and data-modulated. For reference, in the case of classifying users in the following description, k is indicative of an arbitrary user from among all the users, and K is indicative of a total number of users. For example, if 10 users exist, K is 10, and k is adapted to determine an arbitrary user from among 10 users.

Referring to FIG. 2, the signals ($d_1$, $d_2$, ..., $d_K$) associated with respective users are transmitted to corresponding time delay controllers 201, 211, and 221. In more detail, a sequence $d_1$ of the first user signal is transmitted to the first time delay controller 201, a sequence $d_2$ of the second user signal is transmitted to the second time delay controller 211, and a sequence $d_K$ of the Kth user signal is transmitted to the K-th time delay controller 221. The time delay controllers 201, 221, and 221 can adjust a relative start point in the time domain of the time-frequency resource for every user. For example, assuming that the assignment of the time-frequency domain for every user is established as in FIG. 1, the first time delay controller 201 will adjust a relative start point in the time domain of the first time-frequency resource 101 assigned to the first user. After the time delay controllers 201, 211, 221 output signals for every user, which adjust a relative start point, the signals for every user are transmitted to Serial/Parallel (S/P) converters 202, 212, and 222 corresponding to the time delay controllers 201, 211, and 221, respectively The S/P converters 202, 212, and 222 output the signals for every user in parallel in the form of sequences equal to the predetermined number of branches ($n_1$, $n_2$, ..., $n_K$). The number of different branches ($n_1 \neq n_2 \neq, ..., \neq n_K$) may be assigned to the S/P converters 202, 212, and 222, or the number of same branches ($n_1=n_2=\ldots=n_K$) may also be assigned to the S/P converters 202, 212, and 222. In this case, signals for every branch generated from the S/P converters 202, 212 and 222 have durations which increase by the predetermined number of branches ($n_1, n_2, \ldots, n_K$) as compared to a corresponding entry signal. The output signals of the S/P converters 202, 212, and 222 are transmitted to channelizers 203, 213, and 223. The channelizers 203, 213, and 223 are spread in a time domain while being classified according to entry signals equal to the predetermined number of branches. Thereafter, the spread signals are summed, such that a single spread signal is created. Detailed descriptions of the channelizers 203, 213, 223 will be given with reference to FIG. 3. The output signals of the channelizers 203, 213, and 223 are transmitted to the S/P converters 204, 214, and 224. The S/P converters 204, 214, and 224 convert the signal to a parallel signal, and output the output signals of the channelizers 203, 213, and 223 in the form of sequences equal to the predetermined number of branches ($n_1, n_2, \ldots, n_K$). In this case, signals for every branch generated form the S/P converters 204, 214, and 224 are set to a duration which is greater than that of a corresponding entry signal by the predetermined numbers of branches ($n_1, n_2, \ldots, n_K$). Therefore, user signals generated from the S/P converters 204, 214, and 224 through the S/P converters 202, 212, and 222 and the channelizers 203, 213, and 223 may be considered to be signals processed by a CDMA scheme. The number of branches ($n_1, n_2, \ldots, n_K$) predetermined for respective S/P converters 202, 212, and 222 at a first end is equal to the number of branches ($n_1, n_2, \ldots, n_K$) predetermined for respective S/P converters 204, 214, and 224 at a second end, as shown in FIG. 2, but it should be noted that the present invention is not limited to the above embodiment shown in FIG. 2. For example, the number of branches ($n_1, n_2, \ldots, n_K$) predetermined for respective S/P converters 202, 212, and 222 at the first end may be different from the number of branches ($n_1, n_2, \ldots, n_K$) predetermined for respective S/P converters 204, 214, and 224 at the second end.

Output signals of the S/P converters 204, 214, and 224 are transmitted to a frequency hopper 231. The frequency hopper 231 can dynamically change the set of sub-carriers assigned for every user according to fading characteristics of a wireless transmission path. In more detail, the frequency hopper 231 may be considered to be a configuration capable of hopping a frequency of a signal to be transmitted. The time-frequency resource utilization example shown in FIG. 1 may be accompanied by fading characteristics encountered at a specific time. The time delay controllers 201, 211, and 221 are separated from the frequency hopper 231 in FIG. 2. However, the frequency hopper 231 may include the time delay controllers 201, 211, and 221 if needed, such that it can adjust the time delays for every user signal. In this case, the time delay controllers 201, 211, and 221 may be omitted. Although the present invention does not describe a detailed frequency hopping pattern needed for the frequency hopper 231, a variety of frequency hopping patterns available for the frequency hopper 231 can be proposed within a predetermined range in which there is no overlapping of the set of sub-carriers assigned for every user.

The output signal of the frequency hopper 231 is transmitted to an Inverse Fourier Transform (IFT) unit 232. The IFT unit 232 converts the output signal of the frequency domain into another signal of the time domain, and outputs the signal of the time domain. The IFT unit 232 may adapt the OFDM scheme to a signal to be transmitted. The transmission signal converted into the time-domain signal by the IFT unit 232 is transitioned to a Radio Frequency (RF) band, and is then transmitted to a target.

Figure 3:
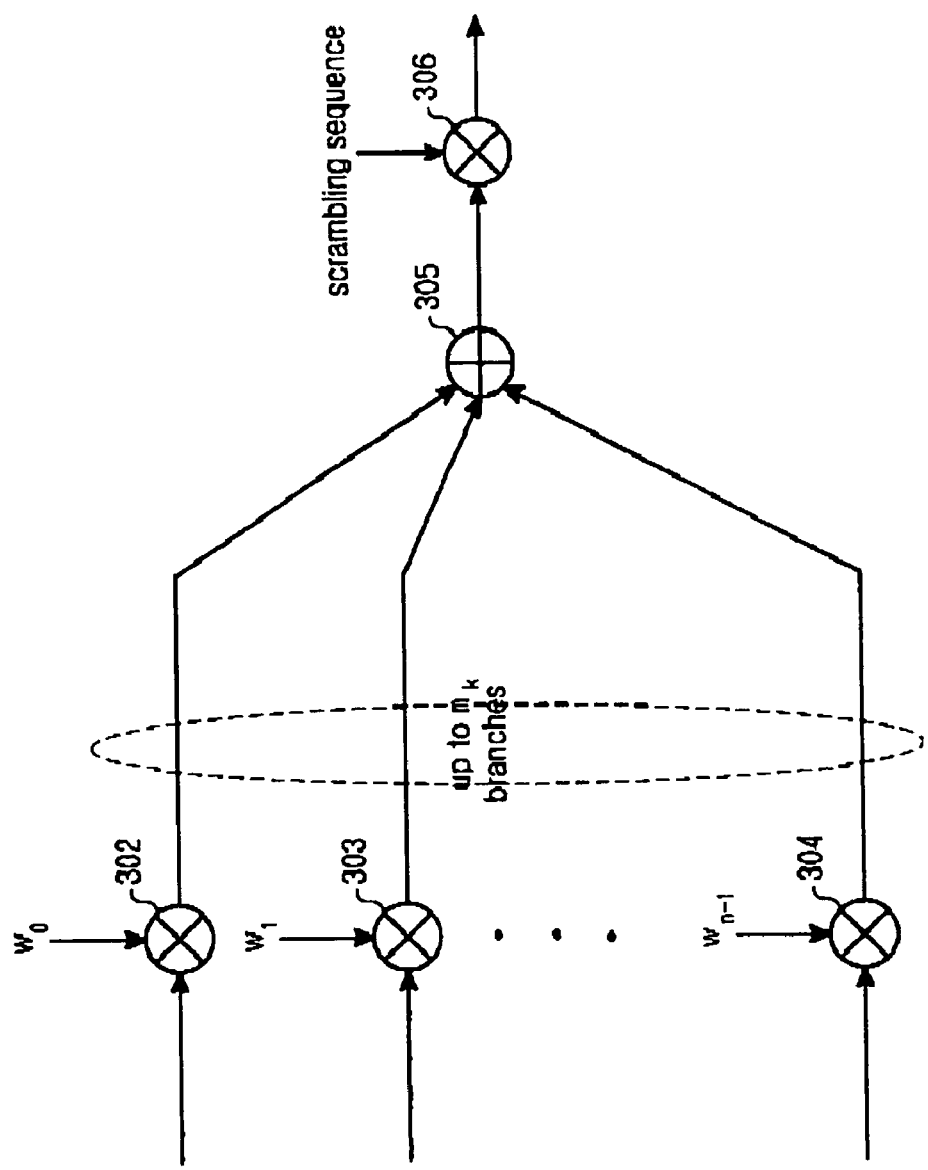
FIG. 3 is a detailed block diagram of a channelizer of FIG. 2 in accordance with the present invention.

FIG. 3 is a detailed block diagram of each channelizer 203, 213, or 223 of FIG. 2 in accordance with the present invention. It is assumed that the following description relates to the K-th channelizer 223 for the K-th user signal.

Referring to FIGS. 2 and 3, the K-th user signal is converted into $n_k$ sequences using the S/P converter 222. The first sequence $n_{(K,1)}$ from among $n_k$ sequences ($n_{(K,1)}, n_{(K,2)}, \ldots, n_{(K,K)}$) is transmitted to a first spreading unit 302, and is multiplied by an orthogonal sequence $W_0$, such that it is spread. The second sequence $n_{(K,2)}$ from among the $n_k$ sequences ($n_{(K,1)}, n_{(K,2)}, \ldots, n_{(K,K)}$) is transmitted to a second spreading unit 303, and is multiplied by an orthogonal sequence $W_1$, such that it is spread. The n-th sequence $n_{(K,n)}$ from among the $n_k$ sequences ($n_{(K,1)}, n_{(K,2)}, \ldots, n_{(K,K)}$) is transmitted to an n-th spreading unit 304, and is multiplied by an orthogonal sequence $W_{n-1}$, such that it is spread. If the aforementioned spreading using different orthogonal sequences for every entry sequence is performed, interference does not occur in the entry sequences. The n spreading signals generated from the first to n-th spreading units 302, 303, and 304 are transmitted to an adder 305. The adder 305 sums the spreading signals, and outputs a sequence of a single spreading signal. The spreading signal generated from the adder 305 is transmitted to a scrambler 306. The scrambler 306 receives a scrambling sequence as another entry signal, and multiplies the spreading signal by the scrambling sequence, and outputs a scrambled signal. The scrambler 306 prevents interference from being generated due to the frequency hit phenomenon wherein a corresponding signal is overlapped with an output signal of a nearby BS (Base Station) in a frequency domain under cellular environments. The scrambler 306 is introduced as a method for improving reception performance of the corresponding signal. If the influence of an interference signal transmitted from the nearby BS is negligible, the scrambler 306 may be omitted if needed. FIG. 3 depicts a detailed configuration of the channelizer 223 associated with m sequences (i.e. first sequences) to be transmitted over the same sub-channel from among the $n_k$ sequences ($n_{(K,1)}, n_{(K,2)}, \ldots, n_{(K,K)}$) equal to the output signals of the S/P converter 222 of FIG. 2. In more detail, FIG. 3 depicts some parts of the channelizer 223 of FIG. 2. The remaining sequences from among the $n_k$ sequences ($n_{(K,1)}, n_{(K,2)}, n_{(K,K)}$) equal to the output signals of the S/P converter 222 of FIG. 2 are grouped in n units. The n grouped sequences are channelized as in FIG. 3, and are transmitted over different sub-channels.

As can be seen from the description of the transmitter shown in FIGS. 2 and 3, the multiple access method according to the present invention can implement a characteristic of the multiple access scheme based on an OFDM scheme, a characteristic of the CDMA scheme, and a characteristic of the frequency hopping scheme which has very strong resistance to the frequency selective fading.

Figure 4:
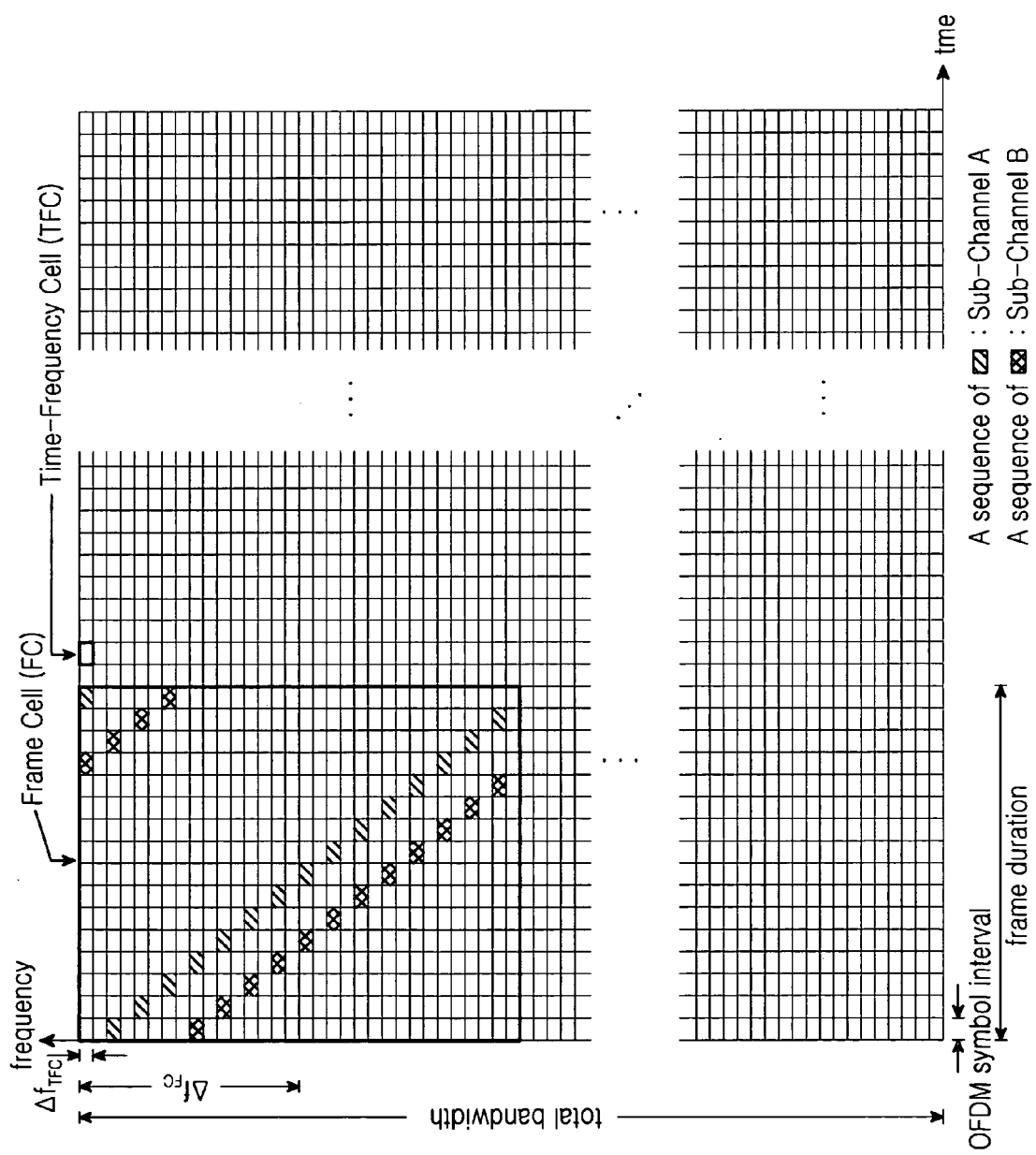
FIG. 4 is a diagram illustrating an example of effectively using time-frequency resources in accordance with the present invention.

FIG. 4 is a diagram illustrating an example of effectively using the time-frequency resource in accordance with the present invention. In FIG. 4, a unit square is comprised of a predetermined number of sub-carriers, and is referred to as a Time-Frequency Cell (TRC) having the same duration as the OFDM symbol interval. A plurality of sub-carriers are assigned to the TFC. Data corresponding to respective sub-carriers assigned to the TFC is processed by the CDMA scheme, and is then processed by the OFDM scheme using the respective sub-carriers. In the case of using the CDMA scheme, data is spread by a predetermined channelization code prescribed for every sub-carrier, and the spread data is scrambled by a prescribed scrambling code. In FIG. 4, a Frame Cell (FC) is defined as a time-frequency domain having both a bandwidth $\Delta f_{FC}$ equal to a predetermined multiple (e.g., 32 times) of the TFC, and a frame duration equal to a predetermined multiple (e.g., 16 times) of the TFC. If the FC is adapted to the present invention, the measurement result of wireless transmission is not frequently reported during the application time of the AMC technology.

FIG. 4 depicts two different sub-channels contained in a single FC, i.e. a sub-channel A and a sub-channel B. The two different sub-channels may be assigned to different users, respectively, or may also be assigned to one user. The respective sub-channels are frequency-hopping-processed by a predetermined frequency interval according to a change in time. This means that sub-channels assigned to respective users are dynamically changed according to fading characteristics varying with time. FIG. 4 depicts an example of a certain pattern of the frequency hopping pattern. However, the present invention is not always limited to the exemplary pattern of FIG. 4, as the frequency hopping pattern of the present invention can be defined in various ways as needed.

In the case of using the AMC technology, an SS (Subscriber Station) measures a current state of a wireless transmission path at predetermined time intervals, and reports the measurement result to a BS (Base Station). Upon receipt of the wireless transmission path state information from the SS, the BS changes the AMC scheme. The changed AMC scheme is reported to the SS. Then, the SS transmits a signal to a desired target using the modulation and coding schemes as changed by the BS. The present invention reports the wireless transmission path state information in FC units, such that it can reduce load encountered by the AMC technology. The FC can be properly adjusted according to the amount of overhead information encountered by the AMC technology. For example, if a large amount of overhead information exists, the FC is widened. If a small amount of overhead information exists, the FC is narrowed.

A transmitter for providing a specific user with a service can generally use a plurality of sub-channels. QoS (Quality of Service) and the number of simultaneous users must be considered in order to use the plurality of sub-channels.

Figure 5:
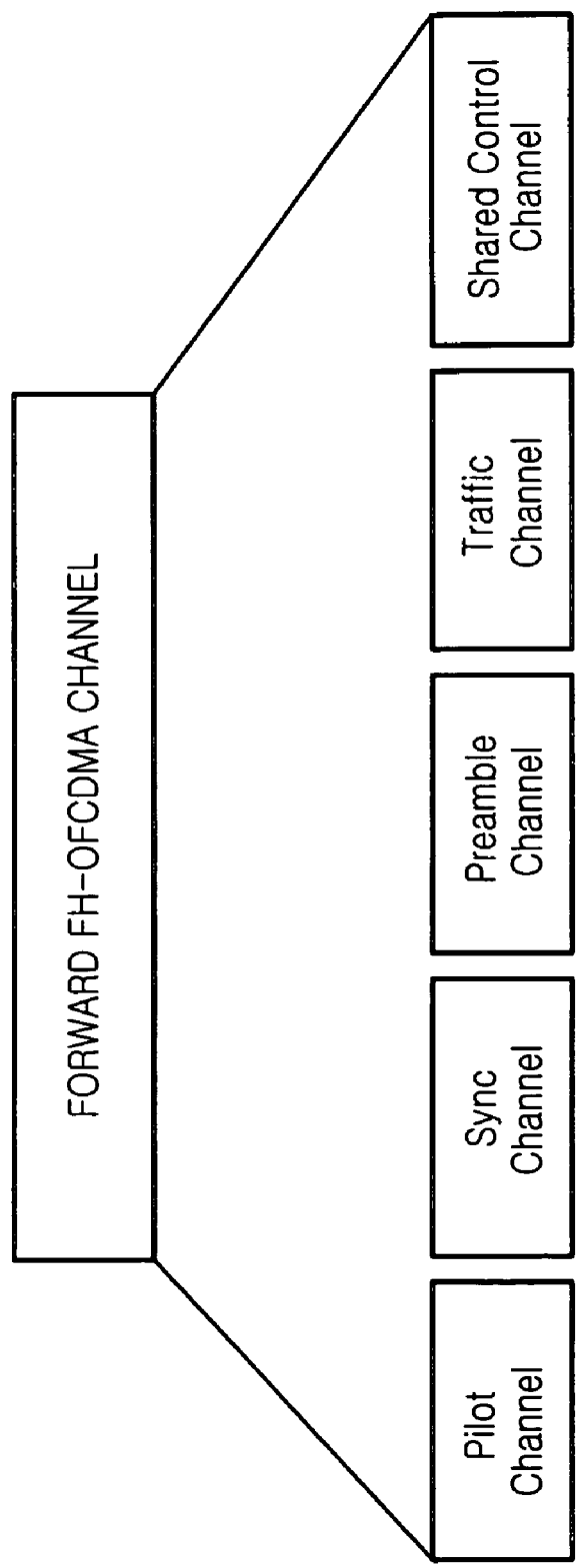
FIG. 5 is a block diagram of forward channels capable of providing a high-speed wireless multimedia service in accordance with the present invention.

FIG. 5 is a block diagram of forward channels capable of providing a high-speed wireless multimedia service in accordance with the present invention. In more detail, a forward channel for an FH-OFCDMA (Frequency Hopping-Orthogonal Frequency Code Division Multiple Access) scheme indicative of a multiple access scheme proposed by the present invention is defined as a "FORWARD FH-OFCDMA CHANNEL" in FIG. 5. The "FORWARD FH-OFCDMA CHANNEL" may be comprised of a pilot channel, a synchronous (sync) channel, a preamble channel, a traffic channel, and a shared control channel, or may also be comprised of only the preamble channel. An example of the "FORWARD FH-OFCDMA CHANNEL" will be described with reference to FIGS. 6 and 7. The pilot channel may allow an SS to acquire a BS, or may be adapted to perform channel estimation. The sync channel may allow the SS to acquire BS information and timing information. The preamble channel is basically adapted to perform frame synchronization, or may also be adapted to perform channel estimation. The traffic channel is adapted as a physical channel for transmitting information data. Although the preamble channel is separately denoted in FIG. 5 to establish frame synchronization, the preamble information transmitted over the preamble channel may be transmitted as a preamble of a frame transmitted over the traffic channel if needed. The shared control channel is used as a physical channel for transmitting control information needed for receiving the information data transmitted over the traffic channel.

Figure 6:
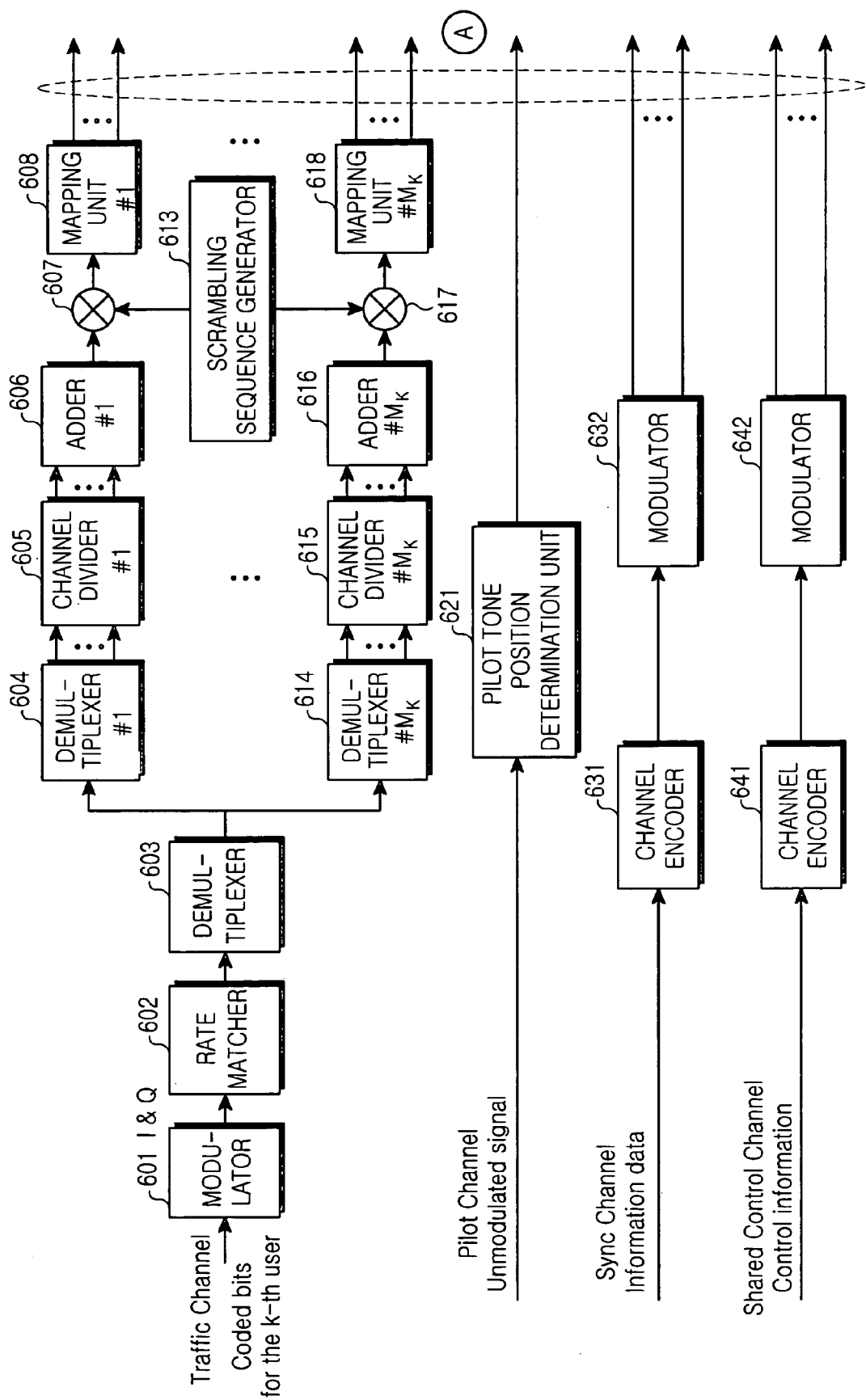
FIG. 6 is a detailed block diagram of a transmitter capable of supporting a multiple access scheme in accordance with the present invention.

FIG. 6 is a detailed block diagram of an exemplary transmitter which implements the channel configuration of FIG. 5. Transmitters of individual channels shown in FIG. 5 are shown in FIG. 6.

The transmitters of individual channels will hereinafter be described with reference to FIG. 6.

Regarding a transmitter for transmitting user data over the traffic channel, a sequence of coded bits of the k-th user is generated from a channel encoding process (not shown), and is then transmitted to a modulator 601. The modulator 601 modulates the coded bits using a QPSK, 16QAM, or 64QAM modulation scheme, and outputs modulation symbols. In the case of using the AMC scheme, the modulation scheme used by the modulator 601 is determined by the BS according to current wireless transmission path state information. A plurality of modulation symbols generated from the modulator 601 each have a complex value.

The modulation symbols generated from the modulator 601 are transmitted to the rate matcher 602. A sequence repeat process or a symbol punching process is applied to the modulation symbols received in the rate matcher 602. In more detail, the rate matcher 602 fabricates the modulation symbols to match a transmission format of a packet transmitted over a radio channel, and outputs the fabrication result. In this case, the transmission format includes the number of modulation symbols capable of being transmitted via a single frame. The modulation symbol sequence generated from the rate matcher 602 is transmitted to a first demultiplexer 603. The first demultiplexer 603 demultiplexes the modulation symbol sequence, and outputs modulation symbol sequences for every sub-channel by the predetermined number of branches. The number of branches corresponds to the number ($M_k$) of sub-channels used for a k-th user service, and $M_k$ may be determined to be a number from 1 to 16. The reference character 'k' a number between 1 and K, and the reference character 'K' is defined as the number of maximum service available users. In this case, the modulation symbol sequences for every sub-channel, which are generated for every branch using the first demultiplexer 603, have predetermined durations. However, this is not related to the duration of the modulation symbol sequence received in the first demultiplexer 603.

Upon receipt of modulation symbol sequences for every sub-channel from the first demultiplexer 603, a maximum of $M_k$ sub-channel transmitters is needed to transmit the received modulation symbol sequences over different sub-channels. Therefore, FIG. 6 depicts $M_k$ sub-channel transmitters. Although the sub-channel transmitters are different from each other with respect to the reception modulation symbol sequences, they perform the same operation, such that the following description will relate to only one sub-channel transmitter for the convenience of description. One or more sub-channels may be assigned to traffic channels of respective users, such that one or more sub-channel transmitters may also be adapted to transmit data over the traffic channels of the respective users.

The modulation symbol sequences for every sub-channel, which have been received from the first demultiplexer 603, are transmitted to a corresponding second demultiplexer from among $M_k$ second demultiplexers 604 and 614. For example, a modulation symbol sequence corresponding to the first sub-channel from among the modulation symbol sequences for every sub-channel, which have been received from the first demultiplexer 603, is transmitted to a second demultiplexer 604. The second demultiplexer 604 demultiplexes the modulation symbol sequence corresponding to the first sub-channel, and outputs a plurality of modulation symbol sequences for every sub-carrier. The number of modulation symbol sequences for every sub-carrier is equal to the number 'm' of sub-carriers contained in only one sub-channel. In this case, the modulation symbol sequences for every sub-carrier each have a predetermined duration which is greater than of the number of modulation symbols for every sub-channel by 'm' times. The modulation symbol sequences for every sub-carrier, which have been received from the second demultiplexer 604, are transmitted to a channel divider 605. The channel divider 605 spreads the modulation symbol sequences for every sub-carrier using an orthogonal sequence having a predetermined length 'm', and outputs the spread modulation symbol sequences. In this case, the modulation symbol sequences for every sub-carrier will be spread by different orthogonal sequences. Output sequences, in chip units, which have been spread according to individual sub-carriers by the channel divider 605, are transmitted to an adder 606. The adder 606 sums the output sequences for every sub-carrier in chip units, and outputs the added result in the form of a single sequence. The output sequence of the adder 606 is transmitted to a scrambler 607. The scrambler 607 multiplies a scrambling code generated from a scrambling sequence generator 613 by the output sequence of the adder 606, and outputs a scrambled sequence. The aforementioned components from the second multiplexer 604 receiving the modulation symbol sequence to the scrambler 607 generating the scrambled sequence may be equal to components needed for signal processing corresponding to the CDMA scheme.

The scrambled sequence is transmitted to a mapping unit 608. The scrambled sequence received in the mapping unit 608 is mapping-processed with sub-carriers comprising a first sub-channel assigned to the scrambled sequence. The mapping unit 608 may perform a frequency hopping function capable of dynamically changing sub-carriers comprising the sub-channel according to fading characteristics of the wireless transmission path.

Although the aforementioned description does not disclose a detailed example, it is obvious that sub-channel transmitters corresponding to the remaining sub-channels other than the first sub-channel can output data to individual sub-channels in the same manner as in the aforementioned sub-channel transmitter.

Secondly, as to the pilot channel transmitter for transmitting a pilot signal (i.e. unmodulated signal) over a pilot channel, the unmodulated signal is transmitted to a pilot tone position determination unit 621. The pilot tone position determination unit 621 determines a sub-carrier position at which a pilot tone is to be inserted. Therefore, the pilot tone will be inserted into the determined sub-carrier position.

Thirdly, as to the synch channel transmitter for transmitting information data over a sync channel, the information data is transmitted to a channel encoder 631. The channel encoder 631 encodes the information data of the sync channel, and outputs the encoded information data. The encoded information data is transmitted to a modulator 632. The modulator 632 modulates the encoded information data according to a predetermined modulation scheme, and outputs the modulation result in the form of sync channel data.

Fourthly, as to the shared channel transmitter for transmitting control information over a shared control channel, the control information is transmitted to the channel encoder 641. The channel encoder 641 encodes the control information of the shared control channel, and outputs the encoded control information. The encoded control information is transmitted to a modulator 642. The modulator 642 modulates the encoded control information according to a predetermined modulation scheme, and outputs the modulation result in the form of shared control channel data.

Figure 7:
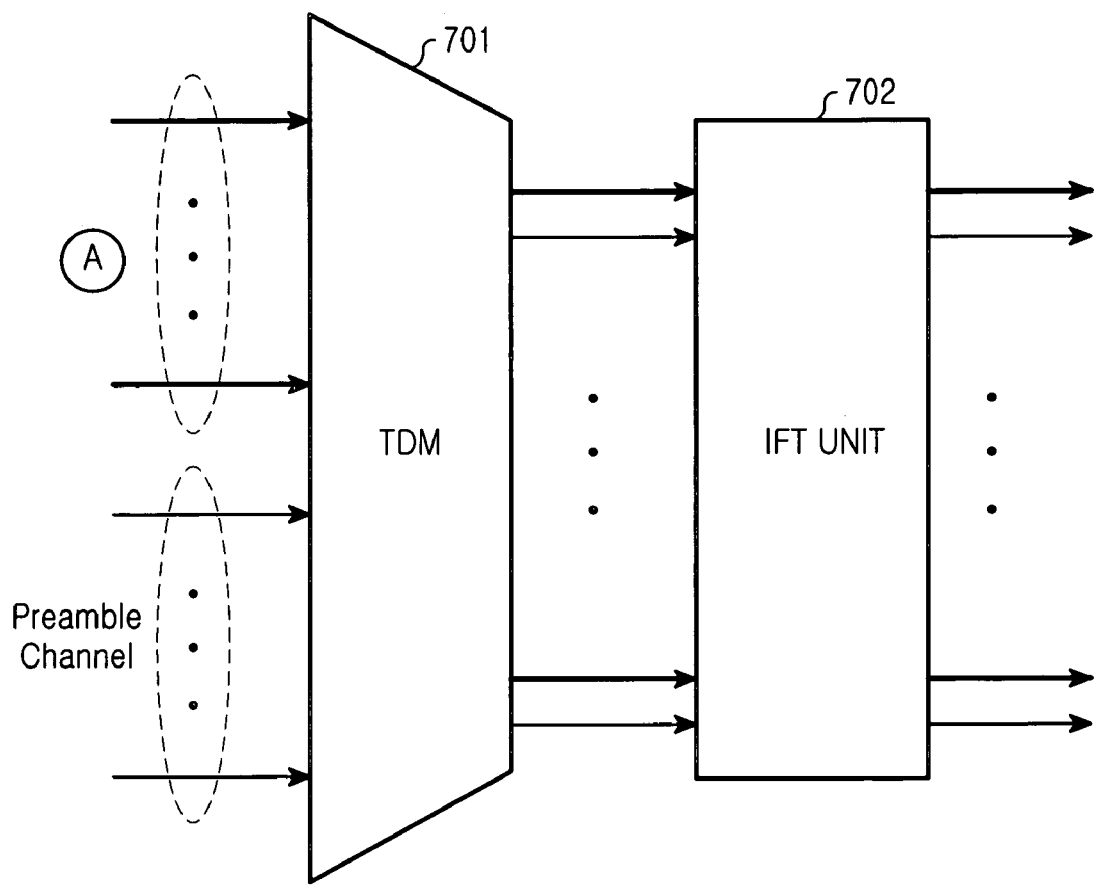
FIG. 7 is a block diagram of a transmitter processing an output signal of the transmitter shown in FIG. 6 in accordance with the present invention.

FIG. 7 depicts a configuration for the FORWARD FH-OFCDMA CHANNEL in accordance with the present invention. An input end "A" shown in FIG. 7 is connected to an output end "A" shown in FIG. 6, such that a transmitter of the present invention can be implemented. Therefore, output signals of the transmitter of FIG. 6 are transmitted to the input end "A" of FIG. 7. The output signals are comprised of traffic channel data, pilot channel data, sync channel data, and shared control channel data, which are generated from each sub-channel.

Referring to FIG. 7, the output signals of FIG. 6 are transmitted to input terminals of a Time Division Multiplexer (TDM) through the input terminal "A". A preamble channel signal is also transmitted to other input terminals of the TDM 701. The TDM 701 TDM-processes the output signals of FIG. 6 and the preamble channel signal, and outputs the TDM-processing result. Referring back to FIG. 4, a single FC is comprised of 16 TFCs in a time domain. The TDM 701 selects/outputs the preamble channel in a first TFC from among the 16 TFCs, and selects/outputs the output signals in the remaining 15 TFCs other than the first TFC. Output signals corresponding to either the preamble channel signal or the remaining channel signals, having been generated from the TDM 701, are transmitted to an IFT (Inverse Fourier Transform) unit 702. The IFT unit 702 IFT-processes its own input signal from among the output signals which correspond to either the preamble channel signal or the remaining channel signals, such that it converts a frequency-domain signal into a time-domain signal. The output signal of the IFT unit 702 is transmitted as "FORWARD FH-OFCDMA CHANNEL" of the present invention.

As apparent from the above description, in the case of using a multiple access scheme and time-frequency resource utilization according to the present invention, time-frequency resources can be effectively used, and spectrum efficiency can be maximized. Therefore, it is expected that the present invention will effectively provide a high-speed wireless multimedia service satisfying the objectives of the next-generation mobile communication system.

Also, the present invention can implement a characteristic of the multiple access scheme based on an OFDM scheme, a characteristic of a CDMA scheme, and a characteristic of a frequency hopping scheme which has very strong resistance to the frequency selective fading.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for transmitting information bit sequences from a BS (Base Station) transmitter to a plurality of users, comprising:

a first set of S/P (Serial/Parallel) converters for dividing each of the information bits received in sub-channel units into a plurality of information bit sequences in response to respective users;

a plurality of channelizers for spreading the divided information bit sequences using different orthogonal codes, combining the spread information bit sequences into a single sequence associated with the individual users, and outputting the single sequence;

a second set of S/P converters for dividing the single sequence, distributing the spread information bit sequences over a plurality of bandwidths capable of mapping-processing the spread information bit sequences with sub-carrier frequencies;

a frequency hopper for frequency hopping for preventing each of the bandwidths from overlapping with time-frequency cells given by the given time interval; and an IFT (Inverse Fourier Transform) unit for IFT-processing the spread information bit sequences outputting from the frequency hopper, and generating the IFT-processed result.

2. The apparatus according to claim 1, wherein the number of information bit sequences is equal to the number of sub-carriers comprising a sub-channel.

3. The apparatus according to claim 1, wherein the frequency hopper converts sub-carriers assigned to individual sub-channels in a previous time domain into secondary sub-carriers based on a characteristic of a wireless transmission path, such that the frequency hopper performs a frequency hopping function.

4. The apparatus according to claim 3, wherein the characteristic of the wireless transmission path is reported according to its current condition in Frame Cell (FC) units.

5. The apparatus according to claim 1, further comprising:
a plurality of time delay controllers corresponding to the number of information bit sequences of the users, for adjusting relative start points of the users in a time domain.

6. The apparatus according to claim 1, wherein the plurality of channelizers further comprises means for dividing a single frame of information bit sequences to be transmitted to individual users into a plurality of division times according to a given time interval, and dividing the information bit sequences within the plurality of division times.

7. The apparatus according to claim 1, wherein each user is assigned at least one sub-channel according to a QoS (Quality of Service) of the user.

8. The apparatus according to claim 1, wherein the orthogonal codes are Walsh codes.

9. A method for transmitting information bit sequences from a BS (Base Station) transmitter to a plurality of users, comprising the steps of:
a) dividing each of the information bits received in sub-channel units into a plurality of information bit sequences in response to respective users;
b) dividing a single frame of information bit sequences to be transmitted to individual users into a plurality of times according to a given time interval, dividing the information bit sequences within the plurality of division times, spreading the divided information bit sequences using different orthogonal codes, combining the spread information bit sequences into a single sequence associated with the individual users, and outputting the single sequence;
c) dividing the single sequence, distributing the spread information bit sequences over a plurality of bandwidths capable of mapping-processing the spread information bit sequences with sub-carrier frequencies;
d) frequency hopping for performing a frequency hopping function such that each of the bandwidths does not overlap with time-frequency cells given by the given time interval; and
e) IFT(Inverse Fourier Transform)-processing the spread information bit sequences, and generating the IFT-processed result.

10. The method according to claim 9, wherein the number of information bit sequences is equal to the number of sub-carriers comprising a sub-channel.

11. The method according to claim 10, wherein the characteristic of the wireless transmission path is reported according to its current condition in Frame Cell (FC) units.

12. The method according to claim 9, wherein the frequency hopping function shifts sub-carriers comprising individual sub-channels in a previous time domain to secondary sub-carriers.

13. The method according to claim 9, further comprising the step of:
f) in response to the information bit sequences of the users, adjusting relative start points of the users in a time domain.

14. The method according to claim 9, wherein the step of combining the spread information bit sequences into a single sequence includes:
summing the spread information bit sequences, and generating a single spread information bit sequence; and
multiplying the spread information bit sequence by a predetermined scrambling code, and generating a scrambled information bit sequence as the single sequence.

15. The method according to claim 9, wherein each user is assigned at least one sub-channel according to a QoS (Quality of Service) of the user.

16. The method according to claim 9, wherein the orthogonal codes are Walsh codes.

17. A transmission apparatus for use in a mobile communication system capable of transmitting information bit sequences from a BS (Base Station) transmitter to a plurality of users, comprising:
a plurality of traffic channel transmitters for dividing a modulation data symbol sequence corresponding to a predetermined user into division modulation data symbol sequences, the number of which is equal to the number of sub-channels assigned to the predetermined user, spreading the respective division modulation data symbol sequences using different channelization codes, and performing a mapping-process with sub-carriers comprising a corresponding sub-channel;
a TDM (Time Division Multiplexer) for receiving a first input signal from the traffic channel transmitters, the first input signal including traffic channel signals from the traffic channel transmitters, a pilot channel signal, and sync (synchronous) and shred channel signals, which have been spread by a predetermined channelization code and have been modulated by a predetermined modulation scheme, and receiving a preamble channel signal as a second input signal, such that the first input signal and the second input signal are selected in time-domain units of the sub-channel; and
an IFT (Inverse Fourier Transform) unit for IFT-processing a signal selected by the TDM, and generating the IFT-processed result.

18. The apparatus according to claim 17, wherein the TDM selects the second input signal in a time domain of an initial sub-channel assigned to the predetermined user in a Frame Cell (FC), and selects the first input signal in time-domains of the remaining sub-channels other than the initial sub-channel.

19. The apparatus according to claim 17, wherein each of the traffic channel transmitters includes
a demultiplexer for dividing each of the division modulation data symbol sequences into a plurality of parts equal to the number of sub-carriers comprising a corresponding sub-channel;

a channelizer for spreading the respective divided modulation data symbol sequences, having been divided according to the sub-carriers, using different channelization codes;

an adder for summing the divided modulation data symbol sequences, having been spread according to the sub-carriers, and generating a single division modulation data symbol sequence;

a scrambler for multiplying the single division modulation data symbol sequence by a predetermined scrambling code, and generating the multiplied result; and a mapping unit for mapping an output signal of the scrambler with individual sub-carriers comprising the corresponding sub-channel.

20. A transmission method for use in a mobile communication system capable of transmitting information bit sequences from a BS (Base Station) transmitter to a plurality of users, comprising the steps of:

a) dividing a modulation data symbol sequence corresponding to a predetermined user into division modulation data symbol sequences, the number of which is equal to the number of sub-channels assigned to the predetermined user, spreading the respective division modulation data symbol sequences using different channelization codes, and performing a mapping-process in association with sub-carriers comprising a corresponding sub-channel;

b) multiplexing a first input signal and a second input signal such that the first input signal and the second input signal are selected in time-domain units of the sub-channel, wherein the first input signal includes traffic channel signals, a pilot channel signal, and sync (synchronous) and shared channel signals, which have been spread by a predetermined channelization code and have been modulated by a predetermined modulation scheme, and a preamble channel signal is the second input signal,; and c) IFT (Inverse Fourier Transform)—processing a signal selected at step (b), and generating the IFT-processed result.

21. The method according to claim 20, wherein step (b) includes the step of:

b1) selecting the second input signal in a time domain of an initial sub-channel assigned to the predetermined user in a Frame Cell (FC), and selecting the first input signal in time-domains of the remaining sub-channels other than the initial sub-channel.

22. The method according to claim 20, wherein step (a) includes:

a1) dividing each of the division modulation data symbol sequences into a plurality of parts equal to the number of sub-carriers comprising a corresponding sub-channel;

a2) spreading the respective divided modulation data symbol sequences, having been divided according to the sub-carriers, using different channelization codes;

a3) summing the divided modulation data symbol sequences, having been spread according to the sub-carriers, and generating a single division modulation data symbol sequence;

a4) multiplying the single division modulation data symbol sequence by a predetermined scrambling code, and generating the multiplied result; and a5) mapping an output signal of step (a4) with individual sub-carriers comprising the corresponding sub-channel.

23. A method for transmitting data in a communication system, comprising the steps of:

dividing a frequency band into a plurality of sub-bands;

selecting a user to use a sub-band among the plurality of sub-bands;

allocating a channel which belongs to the selected sub-band to the user;

controlling an operation of hopping of the allocated channel during a predetermined Orthogoal Frequency Division Multiplexing (OFDM) symbol time interval;

dividing information bits input by a unit of the sub-channel corresponding to each of users into a plurality of information bit streams;

spreading each of the plurality of information bit streams by multiplying the each of the plurality of information bit streams with different channelization codes;

generating a spread information bit stream by adding the plurality of spread information bit streams;

scrambling the spread information bit stream by multiplying the spread information bit stream with a predetermined scrambling code; and dividing the scrambled information bit stream into a plurality of scrambled information bit streams, wherein the hopping is preformed in the sub-band.

24. The method according to claim 23, wherein allocating the channel to the user further comprises controlling an operation of allocating the channel to the user in the sub-band in a plurality of OFDM symbol time interval.

25. The method according to claim 23, further comprising generating time-domain signal by performing inverse Fast Fourier Transform (FFT) for the channel.

* * * * *